(12) United States Patent
Peng et al.

(10) Patent No.: US 7,531,149 B2
(45) Date of Patent: May 12, 2009

(54) SYNTHETIC CONTROL OF METAL OXIDE NANOCRYSTAL SIZES AND SHAPES

(75) Inventors: Xiaogang Peng, Fayetteville, AR (US);
Yongfen Chen, Fayetteville, AR (US);
Nikhil Jana, Singapore (SG); Arun Narayanaswamy, Fayetteville, AR (US)

(73) Assignee: The Board of Trustees of the University of Arkansas, Little Rock, AR (US)

( * ) Notice: Subject to any disclaimer, the term of this patent is extended or adjusted under 35 U.S.C. 154(b) by 535 days.

(21) Appl. No.: 11/204,766

(22) Filed: Aug. 16, 2005

(65) Prior Publication Data

US 2006/0211152 A1 Sep. 21, 2006

Related U.S. Application Data

(63) Continuation-in-part of application No. 10/965,685, filed on Oct. 14, 2004, now Pat. No. 7,160,525, application No. 11/204,766, filed on Aug. 16, 2005.

(60) Provisional application No. 60/511,183, filed on Oct. 14, 2003, provisional application No. 60/601,778, filed on Aug. 16, 2004.

(51) Int. Cl.
*B23B 5/16* (2006.01)
*C01G 5/00* (2006.01)
*C01G 7/00* (2006.01)
*C01G 51/00* (2006.01)
*C01G 55/00* (2006.01)

(52) U.S. Cl. .............................. 423/1; 423/22; 423/23; 423/24; 423/138; 423/139; 428/402; 977/777; 977/811

(58) Field of Classification Search ................. 428/402; 423/1.22, 23, 24, 138, 139; 977/773, 777, 977/811

See application file for complete search history.

(56) References Cited

U.S. PATENT DOCUMENTS

| 5,122,360 | A  | * | 6/1992 | Harris et al. ............. 423/592.1 |
| 6,730,400 | B1 | * | 5/2004 | Komatsu et al. ............ 428/403 |
| 6,869,545 | B2 | * | 3/2005 | Peng et al. ............ 252/301.6 S |
| 6,872,249 | B2 | * | 3/2005 | Peng et al. ..................... 117/68 |
| 6,878,184 | B1 | * | 4/2005 | Rockenberger et al. ....... 75/343 |
| 6,962,685 | B2 | * | 11/2005 | Sun ............................ 423/632 |
| 7,118,727 | B2 | * | 10/2006 | Williams .................. 423/592.1 |

(Continued)

OTHER PUBLICATIONS

Battaglia, D., et al., "Formation of high quality InP and InAs nanocrystals in a noncoordinating solvent," *Nano Lett.* 2002, 2:1027-1030.

(Continued)

*Primary Examiner*—H. (Holly) T Le
(74) *Attorney, Agent, or Firm*—Kilpatrick Stockton LLP

(57) ABSTRACT

A general, reproducible, and simple synthetic method that employs readily available chemicals permits control of the size, shape, and size distribution of metal oxide nanocrystals. The synthesis entails reacting a metal fatty acid salt, the corresponding fatty acid, and a hydrocarbon solvent, with the reaction product being pyrolyzed to the metal oxide. Nearly monodisperse oxide nanocrystals of $Fe_3O_4$, $Cr_2O_3$, MnO, $Co_3O_4$, NiO, ZnO, $SnO_2$, and $In_2O_3$, in a large size range (3-50 nm), are described. Size and shape control of the nanocrystals is achieved by varying the reactivity and concentration of the precursors.

12 Claims, 10 Drawing Sheets

U.S. PATENT DOCUMENTS

| | | | | |
|---|---|---|---|---|
| 7,160,525 | B1* | 1/2007 | Peng et al. | 423/1 |
| 7,259,101 | B2* | 8/2007 | Zurcher et al. | 438/700 |
| 7,407,527 | B2* | 8/2008 | Hyeon | 75/351 |

OTHER PUBLICATIONS

Chen, Y., et al., "Bulk-quantity synthesis and self-catalytic VLS growth of SnO2 nanowires by lower-temperature evaporation," *Chem. Phys. Lett.*, 2003, 369: 16-20.

Cheon, J., et al., "Shape evolution of single-crystalline iron oxide nanocrystals," *JACS*, 2004, 126:1950-1951.

Dai, Z., et al., "Tin oxide nanowires, nanoribbons, and nanotubes," *J. Phys. Chem. B*, 2002, 106: 1274-1279.

Deng, H., et al., "Synthesis of tin oxide nanocrystalline phases via use of Tin(II) halide precursors," *Chem. Mater.* 2003, 15: 2429-2436.

Hyeon, T., et al., "Synthesis of highly crystalline and monodisperse maghemite nanocrystallites without a size-selection process," *JACS*, 2001, 123: 12798-12801.

Lee, K., et al., "Synthesis and optical properties of colloidal tungsten oxide nanorods," *JACS*, 2003, 125: 3408-3409.

Lee, S-M., et al., "Anisotropic shape control of colloidal inorganic nanocrystals," *Adv. Mater.* 2003, 15:441-444.

Liu, Q., et al., "Study of quasi-mondisperse In2O3 nanocrystals: synthesis and optical determination," *JACS*, 2005, 127: 5276-5277.

Murray, C., et al., "Synthesis and characterization of nearly monodisperse CdE (E= S,SE,Te) semiconductor nanocrystallites," *JACS*, 1993, 115:, 8706-8715.

O'Brien, S., et al., "Synthesis of monodisperse nanoparticles of barium titanate: toward a generalized strategy of oxide nanoparticle synthesis," *JACS*, 2001, 123: 12085-12086.

Pacholski, C., et al., "Self-assembly of ZnO: from nanodots to nanorods," *Angew. Chem. Int. Ed.*, 2002, 41:1188-1191.

Pan, Z., et al., "Nanobelts of semiconducting oxides," *Science*, 2001, 291: 1947-1949.

Peng, X., et al., "Kinetics of II-VI and III-V colloidial semicondcutor nanocrystal growth: Focusing of size distributions," *JACS*, 1998, 120: 5343-5344.

Peng, X., "Green chemical approaches toward high-quality semiconductor nanocrystals," *Chem. Eur. J.*, 2002, 8: 334-339.

Peng, X., et al., "Shape control CdSe nanocrystals," *Nature*, 2000, 404: 59-61.

Peng, Z., et al., "Formation of high-quality CdTe, CdSe, and CdS nanocrystals using CdO as precursor," *JACS*, 2001, 123:183-184.

Peng, Z., et al., "Nearly monodisperse and shape-controlled CdSe nanocrystals via alternative routes: nucleation and growth," *JACS*, 2002, 124: 3343-3353.

Qu, L., et al., "Alternative routes toward high quality CdSe nanocrystals," *Nano Lett.* 2001, 1: 333-337.

Rockenberger, J., et al., "A new nonhydrlytic single-precursor approach to surfactant-capped nanocrystals of transition metal oxides," *JACS*, 1999, 121: 11595-11596.

Seo, W., et al., "Preparation and optical properties of highly crystalline, colloidal, and size-controlled indium oxide nanoparticles," *Adv. Mater.* 2003, 15: 795-797.

Sun, S., et al., "Size-controlled synthesis of magnetite nanoparticles," *JACS*, 2002, 124: 8204-8205.

Sun, S., et al., "Monodisperse MFe2O4 (M=Fe, Co, Mn) nanoparticles," *JACS*, 2004, 126: 273-279.

Trentler, T., et al., "Synthesis of TiO2 nanocrystals by nonhydrolytic solution-based reactions," *JACS*, 1999, 121:1613-1614.

Urban, J., et al., "Synthesis of single-crystalline perovskite nanorods composed of barium titanate and strontium titanate," *JACS*, 2002, 124: 1186-1187.

Vestal, C., et al., "Atom transfer radical polymerization synthesis and magnetic characterization of MnFe2O4/polystyrene core/shell nanoparticles," *JACS*, 2002, 124:14312-14313.

Yamazoe, N., "New approaches for improving semiconductor gas sensors," *Sens. Actuators B*. 1991, 5:7-19.

Yin, M., et al., "Synthesis of monodisperse nanocrystals of manganese oxides," *JACS*, 2003, 125: 10180-10181.

Yu, W., et al., "Formation of high-quality CdS and other II-VI semiconductor nanocrystals in noncoordinating solvents: tunable reactivity of monomers," *Angew. Chemie Int. Ed.*, 2002, 41: 2368-2371.

Yu, W., et al., "Formation and stability of size-, shape-, and structure-controlled CdTe nanocrystals: ligand effects on monomers and nanocrystals," *Chem. Mater.*, 2003, 15: 4300-4308.

Zhou, H., et al., "Photoluminescence of indium-oxide nanoparticles dispersed within pores of mesoporous silica," *Appl. Phys. Lett.*, 1999, 75: 495-497.

\* cited by examiner

SYNTHETIC CONTROL OF METAL OXIDE NANOCRYSTAL SIZES AND SHAPES

REFERENCE TO RELATED APPLICATIONS

This application claims the benefit of U.S. Provisional Application 60/601,778, filed Aug. 16, 2004, and is a continuation-in-part of U.S. Ser. No. 10/965,685, filed Oct. 14, 2004, now U.S. Pat. No. 7,160,525, which claims the benefit of U.S. Provisional Application 60/511,183, filed Oct. 14, 2003. The disclosures of these applications are incorporated herein by reference.

STATEMENT OF GOVERNMENT SUPPORT

Development of the present invention has been supported in part by NSF Grant CHE0101178. The Government may have certain rights in the invention.

FIELD OF THE INVENTION

The present invention relates to novel metal oxide nanoparticle compositions and methods of making the same.

BACKGROUND OF THE INVENTION

Magnetic oxide nanocrystals of the first row transition metals, e.g., Cr, Mn, Fe, Co, and Ni are important for an understanding of the magnetic properties in the nanometer regime, and several technical applications ranging from magnetic resonance imaging, drug delivery, battery materials, catalysts, biosensing, nanoelectronic materials, etc. Realization of these goals relies on the availability of size- and shape-controlled nanocrystals. Previously, there is no general method reported for the synthesis of monodisperse magnetic oxide nanocrystals with size- and shape-control.

Colloidal magnetic oxide nanocrystals are traditionally synthesized through the precipitation of nanocrystals from basic aqueous solutions with a broad size distribution. [see, e.g., Vestal, C., et al., *JACS*, 2002, 124, 14312-14313, and references therein] Synthesis of oxide nanocrystals has recently been directed to non-aqueous approaches. [Trentler, T., et al., *JACS*, 1999, 121, 1613-1614; Rockenberger, J., et al., *JACS*, 1999, 121, 11595-11596; O'Brien, S., et al., *JACS*, 2001, 123, 12085-12086; Hyeon, T., et al., *JACS*, 2001, 123, 12798-12801; Sun, S., et al., *JACS*, 2002, 124, 8204-8205; Pacholski, C., et al., *Angew. Chemie* 2002, 41, 1188-1191; Urban, J., et al., *JACS*, 2002, 124, 1186-1187; Seo, W., et al., *Adv. Mater.* 2003, 15, 795-797; Yin, M., et al., *JACS*, 2003, 125, 10180-10181; Lee, K., et al., *JACS*, 2003, 125, 3408-3409; Monge, M., et al., *Angew. Chem.*, 2003, 42, 5321-5324], mostly inspired by the synthesis of high quality semiconductor nanocrystals in non-aqueous media. [Murray, C., et al., *JACS*, 1993, 115, 8706-8715; Peng, X., et al., *JACS*, 1998, 120, 5343-5344; Peng, Z., et al., *JACS*, 2001, 123, 183-184]

The quality of the nanocrystals yielded by non-aqueous solution methods is generally better than that of the nanocrystals synthesized in aqueous solutions. Hyeon et al., supra, reported that γ-$Fe_2O_3$ nanocrystals were synthesized using an organometallic compound, $Fe(CO)_5$, as the precursor and trimethylamine oxide as an oxidant in a non-aqueous solution. Recently, Sun et al., supra, demonstrated the formation of nearly monodisperse $Fe_3O_4$, $CoFe_2O_4$, and $MnFe_2O_4$ nanocrystals [Sun, S., et al., *JACS*, 2004, 126, 273-279] using metal acetylacetonates as the precursor in the presence of 1,2-hexadecanediol, oleylamine, and oleic acid in phenol ether. Yin et al., supra, reported that relatively monodisperse MnO nanocrystals were formed using manganese acetate as the precursor in a coordinating solvent composed of oleic acid and trioctylamine. The sizes of the resulting nanocrystals in these high temperature and non-aqueous solution approaches varied between a few nanometers and about 20 nm, mostly by secondary injections of the precursors—seeded growth—and Ostwald ripening. The size distribution of the magnetic oxides was reported in these three papers, however, shape control of the nanocrystals was seldomly discussed. Very recently, Cheon et al. reported that, without using trimethylamine oxide as oxidant, the organometallic approach yielded γ-$Fe_2O_3$ nanocrystals composed of a mixture of several different shapes. [Cheon, J., et al., *JACS*, 2004, 126, 1950-1951]

The diverse structures and properties of metal oxides make it difficult to develop a general synthetic strategy for these nanocrystals. Greener synthetic approaches for II-VI and III-V semiconductor nanocrystals have been developed almost exclusively based on metal carboxylate salts, which are compatible with non-aqueous media. [Peng, X., *Chem. Eu. J.* 2002, 8, 334-339] It is known that metal carboxylates decompose at elevated temperatures and metal oxides are common decomposition products in many cases. Colloidal II-VI semiconductor nanocrystals are the most developed ones in terms of synthetic chemistry due to the success of organometallic approaches and the alternative (or greener) approaches. [Peng, X., et al., supra; Qu, L., et al., *Nano Lett.* 2001, 1, 333-336; Yu, W., et al., *Angew. Chemie Int. Ed.* 2002, 41, 2368-2371]. The key to this success, as revealed by the mechanism studies, is to maintain a balance between the nucleation and growth stages. This balance can be better achieved by non-coordinating solvent approaches introduced recently. This may be because the reactivity of precursors in non-coordinating solvents can be fine-tuned by varying the bonding strength of the ligands to the monomers, the concentration, chain length, and/or configuration of the ligands for the monomers. [Yu, W., et al., supra; Yu, W., et al., *Chem. Mater.* 2003, 15, 4300-4308; Battaglia, D., et al., *Nano Lett.* 2002, 2, 1027-1030]

Synthesis of ZnO nanocrystals and other types of nanostructures has attracted significant attention in recent years because of its potential as UV emitting materials, catalysts, host materials for doped nanocrystals, etc. Transparent conducting oxides (TCOs) have found a variety of applications due to their best available performance in terms of conductivity, transmissivity, excellent stability and good surface morphology. Among them, indium oxide, a wide band gap n-type semiconductor, and indium tin oxide (ITO) have been employed as microelectronic device materials in solar cells, flat panel displays, sensors and architectural glasses. Also, sensing devices based on metal oxide semiconductors like $In_2O_3$ and tin oxide ($SnO_2$) are used for the detection of carbon monoxide and nitrogen oxides. Materials with high surface area are advantageous for obtaining a good sensitivity in sensing applications. It has been demonstrated that a decrease in the size of the metal oxide crystallite leads to a considerable increase in sensitivity. [Yamazoe, N. *Sens. Actuators B*. 1991, 5, 7] A few reports on the preparation of $In_2O_3$ nanoparticles and nanowires have appeared recently in the literature. [Zhou, H., et al., *Appl. Phys. Lett.* 1999, 75, 495; Murali, A., et al., *Nano Lett.* 2001, 1, 287; Liu, Q., et al., *JACS*, 2005, 127, 5276] Most reports on the synthesis of nanostructured $SnO_2$ have focused on the direct oxidation of metallic tin, tin(II) halides etc. [Pan, Z., et al., *Science* 2001, 291, 1947; Dai, Z., et al., *J. Phys. Chem. B* 2002, 106, 1274; Chen, Y., et al., *Chem. Phys. Lett.* 2003, 369, 16; Deng, H., et al., *Chem. Mater.* 2003, 15, 2429]

Shape control is important for nanocrystals because of their morphology-dependent fundamental and technical importance. A model has been established for shape and size control of the mostly studied II-VI semiconductor nanocrystals, which implies non-equilibrium shaped nanocrystals require high remaining monomer concentrations—low yield reactions—to prevent Ostwald ripening and intra-particle ripening. [Peng, X., et al., *Nature* (London) 2000, 404, 59-61; Peng, Z., et al., *JACS*, 2001, 123, 1389-1395; Peng, Z., et al., *JACS*, 2002, 124, 3343-3353; Lee, S.-M., et al., *Advanced Materials* (Weinheim, Germany) 2003, 15, 441-444; Manna, L., et al., *Nature Materials* 2003, 2, 382-385] Similarly, focusing of size distribution, which is the process needed for the growth of monodisperse dot-shaped nanocrystals, occurs only when monomer concentration is higher than the solubility of all nanocrystals in the solution. When the monomers deplete to a certain level, defocusing of size distribution (Ostwald ripening) occurs and a broad size distribution will be the result. These established models seem to imply that monodisperse high quality nanocrystals, especially when non-equilibrium shaped, cannot be obtained without some monomers remaining in the solution.

Shape-controlled growth of crystals in solution has traditionally been called crystal habits and has been explained by two models, Wuff facet theory and surface additive mediated growth, which are also applied for explaining the growth of colloidal nanocrystals and nanostructures. Studies of nanocrystal growth have revealed several new routes, such as, template-directed, oriented attachment, photoradiation-induced growth, and monomer activity mediated growth.

In the patent literature, U.S. Pat. No. 6,225,198 (issued to Alivisatos et al.) proposes a method for controlling the shape of semiconductor nanocrystals by adjusting the ratio of surfactants in a mixture of Group II and VI precursors. U.S. Pat. No. 6,440,213 (issued to Alivisatos et al.) proposes a method of making surfactant-capped nanocrystals of transition metal oxides. U.S. Pat. No. 6,855,202 (issued to Alivisatos et al.) proposes a method of making shaped nanocrystal particles comprising a plurality of crystal structures. U.S. Pat. No. 6,872,249 (issued to Peng et al.) proposes a method of synthesizing nearly monodisperse Cd chalcogenide nanocrystals. U.S. Patent Publication 2004/0101976 (of Peng et al.) reports a method of stabilizing colloidal suspensions of nanocrystals by coating the crystals with bulky organic dendron molecules. U.S. Patent Publication 2005/0129947 (of Peng et al.) reports a method of making nearly monodisperse colloidal semiconductor nanocrystals having a core/shell structure. None of the above references propose a general method for making high quality metal oxide nanocrystals having a monodisperse size distribution and/or a controlled shape.

SUMMARY OF THE INVENTION

The present invention is for compositions and methods of nanoparticles comprising a metal oxide. The metal oxide particles are preferably crystalline, semi-crystalline or polycrystalline, and also preferably have a monodisperse size and/or shape distribution. As used herein, the term "monodisperse", and equivalents thereof, refers to a nanocrystal size distribution in which the standard deviation is within about 10%. The metal oxide nanoparticles preferably have a particle size in the range of about 5 nm to about 100 nm.

A plurality of nanoparticles of the invention can be synthesized by combining a metal fatty acid salt, a fatty acid, and a hydrocarbon solvent to form an admixture thereof. In comparison with other methods, the composition of the reaction mixture is the simplest and most generally applicable. Fatty acid salts are the most common and stable metal compounds soluble in organic media. Moreover, whenever the fatty acid salts are not reactive, activation agents such as alcohol and/or amines, can be employed. The admixture is then heated to a temperature of at least 300° C. until the metal oxide particles are formed.

A method of the invention is general for many metals, and is exemplified herein for oxides of Fe, Mn, Cr, Ni, Co, Zn, In and Sn, and combinations thereof.

DETAILED DESCRIPTION OF THE INVENTION

As described hereinbelow, the present invention is illustrated with respect to the formation of metal oxide nanocrystals of Fe, Mn, Cr, Ni, Co, Zn, In and Sn, and combinations of these.

$Fe_3O_4$

Figure 1:
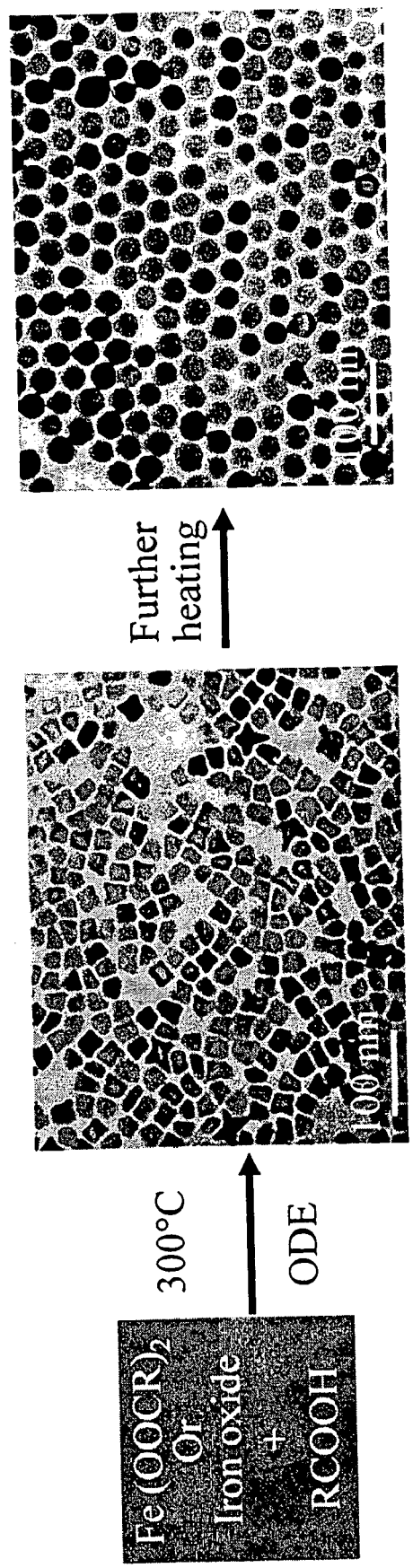
FIG. 1 depicts a schematic illustration of the formation of $Fe_3O_4$ nanocrystals. The middle and right panels are TEM (transmission electron microscopy) images of the as-synthesized nanocrystals taken at different reaction times.

A $Fe_3O_4$ nanocrystal system was employed as a model system for studying the growth of oxide nanocrystals. See FIG. 1. High temperature pyrolysis made it possible to follow the temporal evolution of the size and shape of the nanocrystals, because the pyrolysis reaction was quenched completely by lowering the temperature of the mixture to room temperature. In contrast with studies carried out for semiconductor nanocrystals, the reaction was monitored by taking TEM measurements of the quenched aliquots at different reaction intervals.

In order to avoid the formation of oxide mixtures, the reaction temperatures were carefully controlled. Below 300° C., the reactions were still quite slow, typically taking several tens of minutes to complete. The formation of nanocrystals included several stages. In the beginning, formation of very small particles was observed after the solution was heated for within about ten minutes. After this initial stage, quasi-cube shape nanocrystals with a small fraction of star-shaped ones were observed as the common products. The cubes were much more stable and readily observable when a high concentration of a fatty acid with a relatively long chain was used as the ligands.

The quasi-cube nanocrystals gradually changed to nearly monodisperse dot-shaped nanocrystals upon heating at the same temperature. The volumes of the cubes and the subsequently observed dots were approximately the same, indicating a likelihood of intra-particle ripening, as observed in the case of semiconductor nanocrystals. The monodisperse dot nanocrystals were found to hold the size distribution for several tens of minutes. Typically, this time window increased as the chain length and/or concentration of the ligands increased. After that, the size distribution of the dot shaped nanocrystals became more and more broad (not shown), likely due to the Ostwald ripening process.

Figure 2:
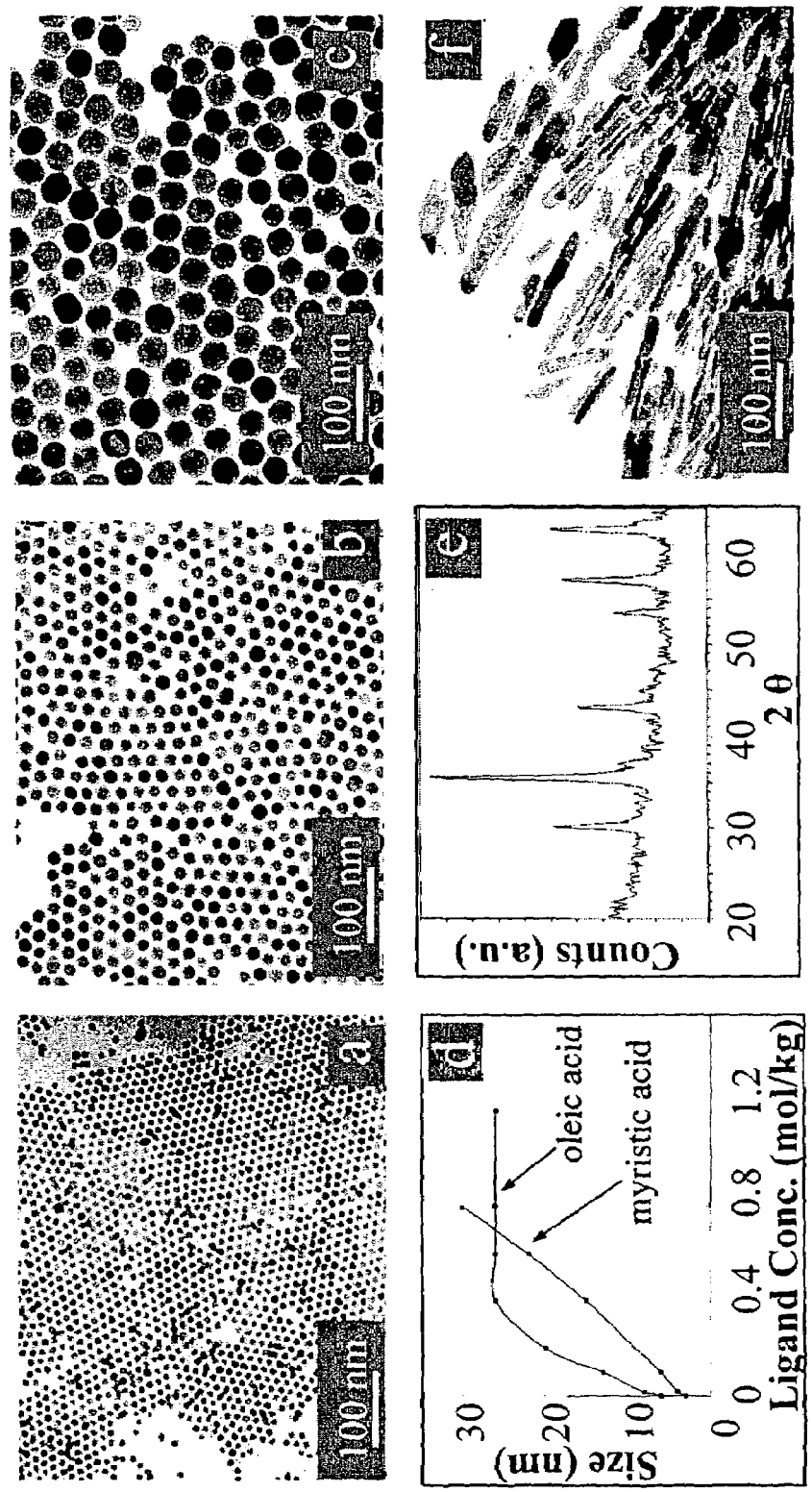
FIG. 2, Panels a, b, and c are TEM images of as-prepared dot-shaped $Fe_3O_4$ nanocrystals. The ligand concentration and structure dependence of the dot sizes is illustrated in panel d. The X-ray powder diffraction pattern of a dot-shaped $Fe_3O_4$ nanocrystal is shown in panel e. Panel f is the TEM image of the as-prepared elongated $Fe_3O_4$ nanocrystals.

As shown in FIG. 2, nearly monodisperse dot-shaped $Fe_3O_4$ nanocrystals were found obtainable in the size range between about 6 nm and 50 nm without using any activation reagents. Even smaller $Fe_3O_4$ nanocrystals were formed by adding a certain amount of activation reagents, primary amines or alcohols, into the reaction mixture prior to heating. The size control of the $Fe_3O_4$ nanocrystals was achieved by varying the concentration and/or the chain length of the fatty acids when the monomer concentration was fixed. The higher was the ligand concentration, the larger was the size of the nearly monodisperse nanocrystals. When a fatty acid with a relatively long chain was used, such as stearic acid and oleic acid, the size of the monodisperse nanocrystals achieved before the Ostwald ripening stage was almost fixed at a certain value that was dependent on the ligand concentration. However, before defocusing of the size distribution of the nanocrystals, the size of the nearly monodisperse $Fe_3O_4$ nanocrystals synthesized using fatty acids with a relatively short chain length (10-14 carbon per molecule) was found to increase in a significant size range as the reaction proceeded. Generally, the overall reaction rate was accelerated by shortening the chain length, which is consistent with the decrease of the reactivity of the monomers. Interestingly, if two types of fatty acids were used in a single reaction, two distinguishably sized $Fe_3O_4$ nanocrystals were found under TEM (data not shown).

The shape control of $Fe_3O_4$ nanocrystals was partially achieved. Besides the dots and the quasi-cubes mentioned hereinabove, some $Fe_3O_4$ nanocrystal rods/wires were observed when the ligand concentration was very high (higher than five times of the total iron concentration in the solution) or the monomer concentration was much higher than the typical reaction. See FIG. 2f. However, the yield of these elongated shapes was low and always mixed with a high population of dots.

The X-ray powder diffraction (XRD) (FIG. 2e) and electron diffraction patterns of $Fe_3O_4$ nanocrystals yielded by the thermal decomposition of either Fe(II) or Fe(III) salts were all consistent with that of $Fe_3O_4$ crystals. The domain size determined by the peak widths of the XRD patterns matched the size determined by the TEM measurements, indicating the single crystalline nature of the nanocrystals. The $Fe_3O_4$ nanocrystals were found to be stable as a colloidal solution at room temperature. Purification of the nanocrystals was performed by the addition of acetone into the toluene/chloroform solution of the nanocrystals. Most of the precipitate would remain to be soluble in toluene/chloroform although some nanocrystals might become insoluble, especially when the purification procedure was repeated multiple times. The precipitates appeared to be black, as expected, for $Fe_3O_4$ and responded strongly to an external magnetic field induced by a laboratory magnetic bar. The yield of $Fe_3O_4$ nanocrystals was high, above 85%, if the free fatty acid concentration was not too high.

MnO

Figure 3:
FIG. 3 shows TEM images of as-prepared MnO nanocrystals.
Figure 3:
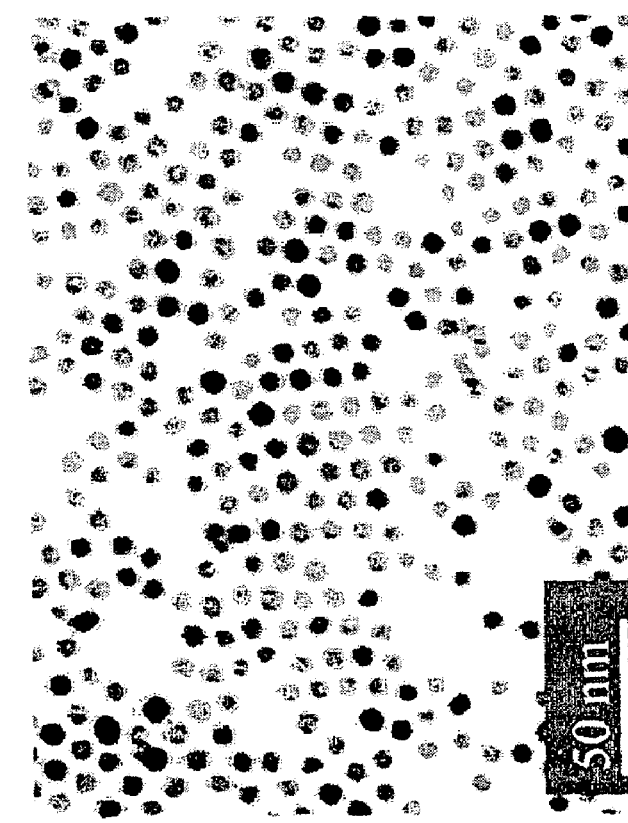

Formation of MnO nanocrystals was found to be very much similar to that of $Fe_3O_4$ nanocrystals. Similar to $Fe_3O_4$ nanocrystals, reaction temperature at 300° C. was sufficient. As shown in FIG. 3, quasi-cube and dot-shaped MnO nanocrystals were observed for this system. The crystal structure of the nanocrystals was found to be consistent with rock salt MnO, and the powder sample isolated from the reaction flask appeared to respond weakly to an external magnetic field induced by a laboratory magnetic bar, which is different from the antiferrimagnetic nature of bulk MnO crystals.

Figure 4:
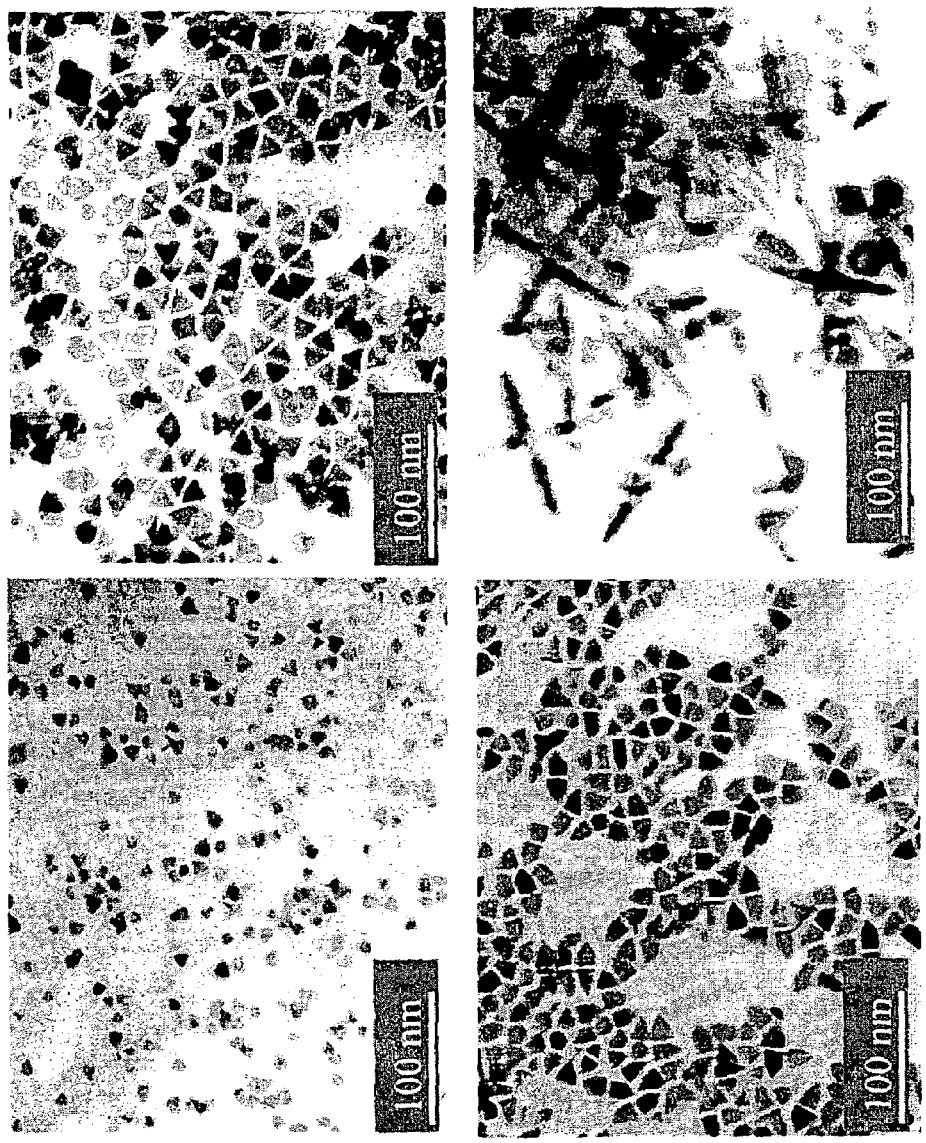
FIG. 4 shows TEM images of as-synthesized $Co_3O_4$ nanocrystals. Top row: triangular; bottom left; bullet-like; bottom right: rod-shaped.

$Co_3O_4$ $Co_3O_4$ nanocrystals were obtained by the decomposition of Co(II) fatty acid salts. In comparison with $Fe_3O_4$ and MnO nanocrystals, the formation of $Co_3O_4$ nanocrystals was found to be more difficult. When the reaction temperature was below 320° C., no nanocrystal formation was observed. Using cobalt stearate $(Co(SA)_2)$ as the precursor at a concentration of 0.2 mol/kg, no particle formation was observed if the free ligand concentration was higher than approximately 0.6 mol/kg. The obtained nanocrystals were typically either triangular (FIG. 4, top row), bullet-like (FIG. 4, left bottom), or rod-shaped (FIG. 4, right bottom). Different from the $Fe_3O_4$ and MnO nanocrystals, these faceted nanocrystals were very stable upon prolonged heating for at least 5 hours, and conversion to dot-shaped ones was not observed. However, these faceted shapes did become more round after some additional free fatty acids were added into a stabilized reaction system at the given reaction temperature. This implies that the stability of the faceted nanocrystals in the original reaction solution was probably due to the low fatty acid concentration allowed for the reaction system.

NiO

Figure 5:
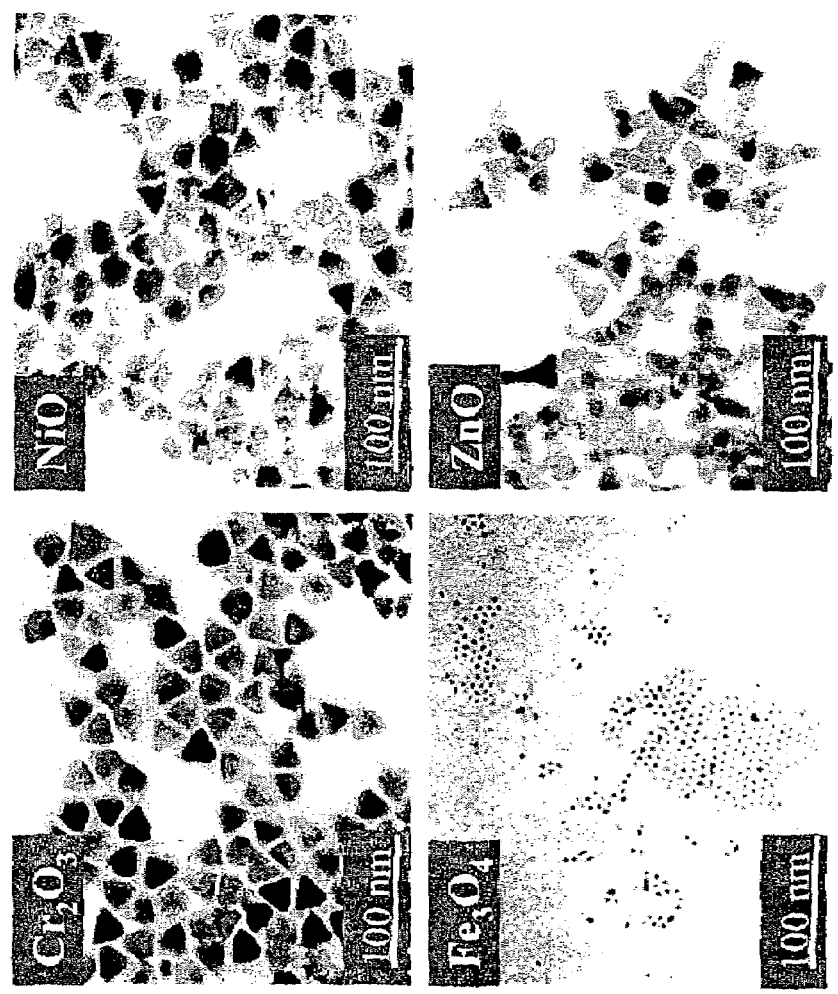
FIG. 5 shows TEM images of $Cr_2O_3$, $Fe_3O_4$, NiO and ZnO nanocrystals. Except NiO nanocrystals, the other nanocrystals shown were all formed by catalytic reactions.

Nickel oxide nanocrystals were more difficult to form in comparison with the other types of magnetic oxide nanocrystals mentioned above. The formation of NiO nanocrystals did not occur if fatty acids with a relatively long hydrocarbon chain, such as stearic acid or oleic acid, were used as the ligands. When nickel myristate and myristic acid were employed and a relatively high temperature (around 340° C.) was used, the reaction yielded triangular NiO nanocrystals (FIG. 5).

$Cr_2O_3$

Among all five types of magnetic oxides tested, formation of $Cr_2O_3$ nanocrystals was found to be most difficult. No sign of decomposition of the precursors was observed up to 380° C. with all types of fatty acid salts tested if the system was composed of chromium fatty acid salts and non-coordinating solvents (with or without free fatty acids). As shown in FIG. 5, triangular $Cr_2O_3$ nanocrystals were synthesized at 340° C. when a small amount of octadecylamine (0.2 mol/kg) was added into the reaction system with a precursor concentration at 0.2 mol/kg, i.e., the ratio between stearate and amine being 2:1. The precipitate of $Cr_2O_3$, similar to NiO and $Co_3O_4$ nanocrystals, responded to the external magnetic field induced by a laboratory magnetic bar.

ZnO

The above approach, pyrolysis of metal fatty acid salts, was extended to other types of oxide nanocrystals, which are not magnetic in nature. Formation of ZnO nanocrystals (FIG. 5) was observed when a small amount of amine or alcohol was added into the system. Activating reagents, such as a small amount of amines or alcohols, significantly accelerated the formation of all types of metal oxide nanocrystals discussed above. Typically, the size of the nanocrystals was smaller if an activating reagent was in the reaction solution. This is consistent with the increased reactivity coefficient of the precursors. For instance, the size of nearly monodisperse $Fe_3O_4$ nanocrystals could reach as small as 3-4 nm for amine-activated reactions. In addition to the pseudo bullet-shaped ZnO nanocrystals, preliminary results further revealed that nearly monodisperse triangle- and dot-shaped ZnO nanocrystals were also obtained. Alcohols were typically milder activating reagents than amines.

Figure 6:
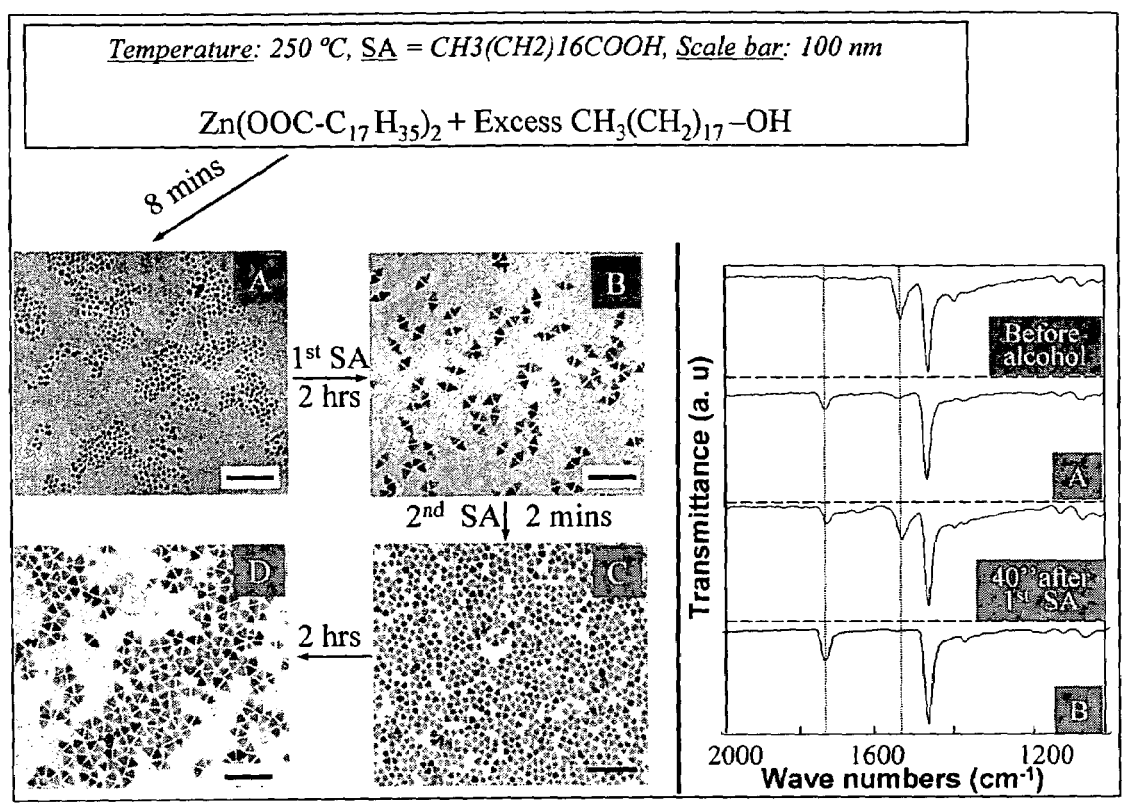
FIG. 6, left panel shows TEM images of the reversible shape transformation between pyramids and dots of ZnO nanocrystals. Right panel: FTIR spectra of the reaction mixture taken at different stages.

The reaction scheme and the resulting nanocrystals at different stages are illustrated in FIG. 6. Zinc stearate was found to be stable in hydrocarbon solvents with reaction temperature up to 320° C. The FTIR spectrum before the addition of alcohol is dominated by the $—CH_2—$ vibration (the strongest one, 1466 $cm^{-1}$) and $—COO^-$ asymmetric vibration (the second strongest one, 1536 $cm^{-1}$) in the 1000-2000 $cm^{-1}$ spectrum window. However, with alcohol added in, zinc stearate immediately became unstable and it decomposed quite rapidly. The completion of the reaction is evidenced by the FTIR spectra. For instance, a few minutes after the addition of the alcohol, the $—COO^-$ asymmetric vibration peak decreased by about 95% (relative to the $—CH_2—$ vibration band) and an ester $—C=O$ vibration band (1730 $cm^{-1}$) appeared. After careful purification, it was verified that stearate are the surface ligands for the resulting ZnO nanocrystals, which means that a small portion of the remaining 5% of the $—COO^-$ asymmetric vibration peak should come from the surface ligands.

The initial nanocrystals formed by this reaction were faceted wurtzite nanocrystals with a relatively broad size and shape distribution (FIG. 6, panel A). The size, shape, and size/shape distribution of the nanocrystals revealed by TEM measurements, the UV-Vis absorption, and the FTIR spectrum did not change upon further heating for as long as seven hours. The mass yield counted by zinc atoms was determined to be approximately 100%. This confirms that, after the precursors consumed completely, nanocrystals despite of their sizes and shapes in this specific system are stable for a high yield reaction.

Although the nanocrystals as well as the entire reaction system were stable for hours under the above conditions, some dramatic changes were observed when stearic acid was introduced into the reaction system. The nanocrystals were eventually converted to stable pyramid-shaped ones, nanopyramids, which appear like triangular in TEM images (FIG. 6, panels B and D). The stable nanopyramids became unstable again if additional fatty acids were added into the reaction solution.

Careful examination of the temporal evolution of the particle morphology revealed that the addition of fatty acids into the reaction solution of the nanopyramids converted the nanopyramids (FIG. 6, panel B) into relatively small dot-shaped ones (FIG. 6, panel C), and then, these dot-shaped nanocrystals grew back to stable nanopyramids (FIG. 6, panel D). This nanopyramid-dot-nanopyramid transition could be repeated several cycles, if the total number of moles of stearic acid and stearate from zinc stearate added into the reaction system was not more than the excess alcohol injected in.

The size of the pyramids after each dissolution-growth cycle could be varied by adding a different amount of stearic acid. The initial and final shape and average size of the nanopyramids remained approximately the same after the given cycle of shape evolution (FIG. 6, panels B and D). This is apparently the first observation of reversible shape evolution without changing both the size and shape of nearly monodisperse nanocrystals. If significantly more stearic acid was added into the system with a sufficient amount of alcohol in the solution, the average size of the pyramids could also be bigger than the initial ones. If the amount of stearic acids was in large excess and not enough alcohol in the solution, the nanocrystals would be smaller. Further increasing the amount of stearic acid would dissolve all nanocrystals permanently.

FTIR spectra revealed that the shape evolution was accompanied by the relative intensity change of the carboxylate and the ester vibration bands. All stearic acid added into the system was converted to zinc stearate almost instantaneously. This indicates that stearic acid dissolved ZnO nanocrystals rapidly, which is consistent with the size decrease of the transition-state (dot-shaped) nanocrystals. When the nanocrystals grew back to pyramids, the vibration band of the carboxylate group disappeared again and the intensity of the ester vibration band increased in comparison to the $—CH_2—$ reference band at 1466 $cm^{-1}$. This indicates that the shape evolution cycle is accompanied by the formation of esters by the fatty acids added in and the existing excess alcohol in the reaction solution.

The shape of the nanocrystals is confirmed to be pyramid-shape, although their two-dimensional (2D) projection in TEM images looks like triangular. This is confirmed by rotating the TEM grid along a fixed axis. High resolution TEM images revealed that the c-axis of the wurtzite structure is perpendicular to the basal plane of the pyramids. Nanopyramids intended to pack in pairs. This tendency seems to be caused by the well-developed facet of the basal plane, which is also the slow growth facet. In comparison, the lateral faces of the nanopyramids are not perfectly developed although each nanopyramid is a single crystal.

Figure 7:
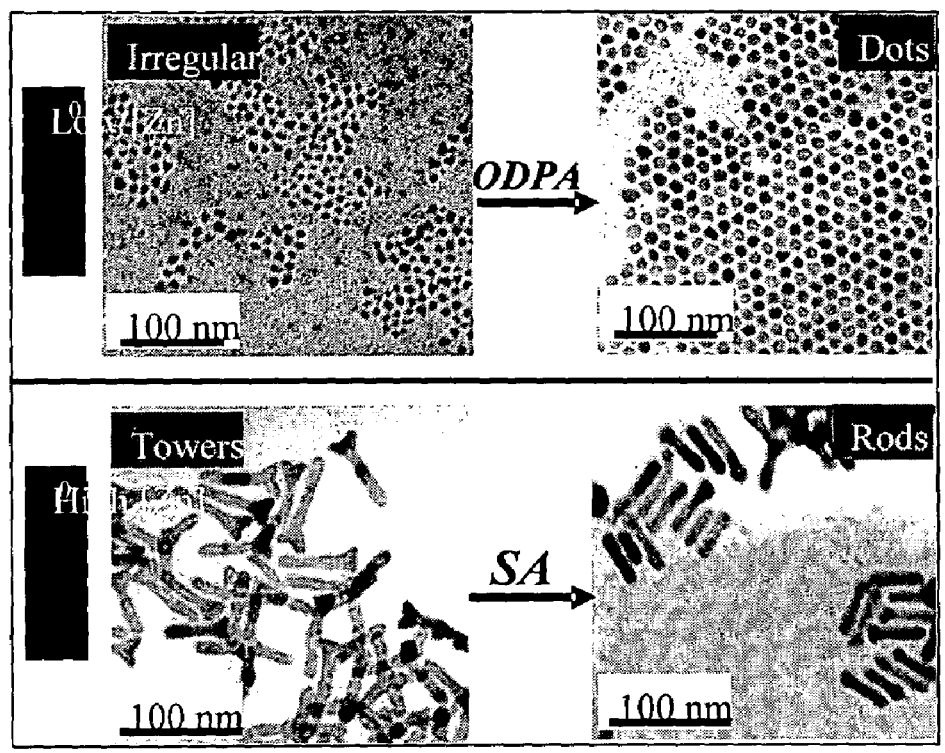
FIG. 7, top panel, shows formation of stable dot-shaped nanocrystals. Only initial nanocrystals (left) and the final products (right) are shown and the nearly mondisperse pyramid nanocrystals before addition of ODPA are similar to the ones shown in FIG. 6. Bottom panel shows transition of tower-shaped nanocrystals to rod-shaped ones.

The transition dot-shaped nanocrystals from the initial pyramids to the next one were typically not very spherical, often mixed with some small pyramids. This is likely because there was an excess amount of alcohol in the solution and some growth always accompanied with the dissolution process although the growth reaction is slower as revealed by TEM and FTIR measurements. If octadecylphosphonic acid (ODPA) was used in place of stearic acid, almost perfectly dot-shaped nanocrystals with good size distribution could be obtained as stable products (FIG. 7). This is because Zn phosphonic salts are stable under the reaction conditions even with a large amount of alcohol in the solution. It should be pointed out that the yield of these nearly monodisperse dot-shaped nanocrystals was below unity because of the stability of zinc phosphonic salts although these dot-shaped nanocrystals were stable under the growth conditions.

If a very high initial concentration of zinc stearate ($[Zn]_0$)—ten times higher than that of the typical reaction—was used, stable tower-shaped nanocrystals were formed (FIG. 7, bottom left). These tower-shaped nanocrystals were grown from the nanopyramids along the C-axis. If a small amount of stearic acid was added into the tower-shaped nanocrystal solution, the nanocrystals became rods by shortening the length and removing the small fin-ring around the basal plane of the nanotowers (FIG. 7, bottom right). Further heating of these rods with the presence of an excess amount of alcohol forms a mixture of towers, rods, and some pyramids. The appearance of the new shape, pyramids, is likely a result of the secondary nucleation and growth caused by the regenerated zinc stearate.

Figure 8:
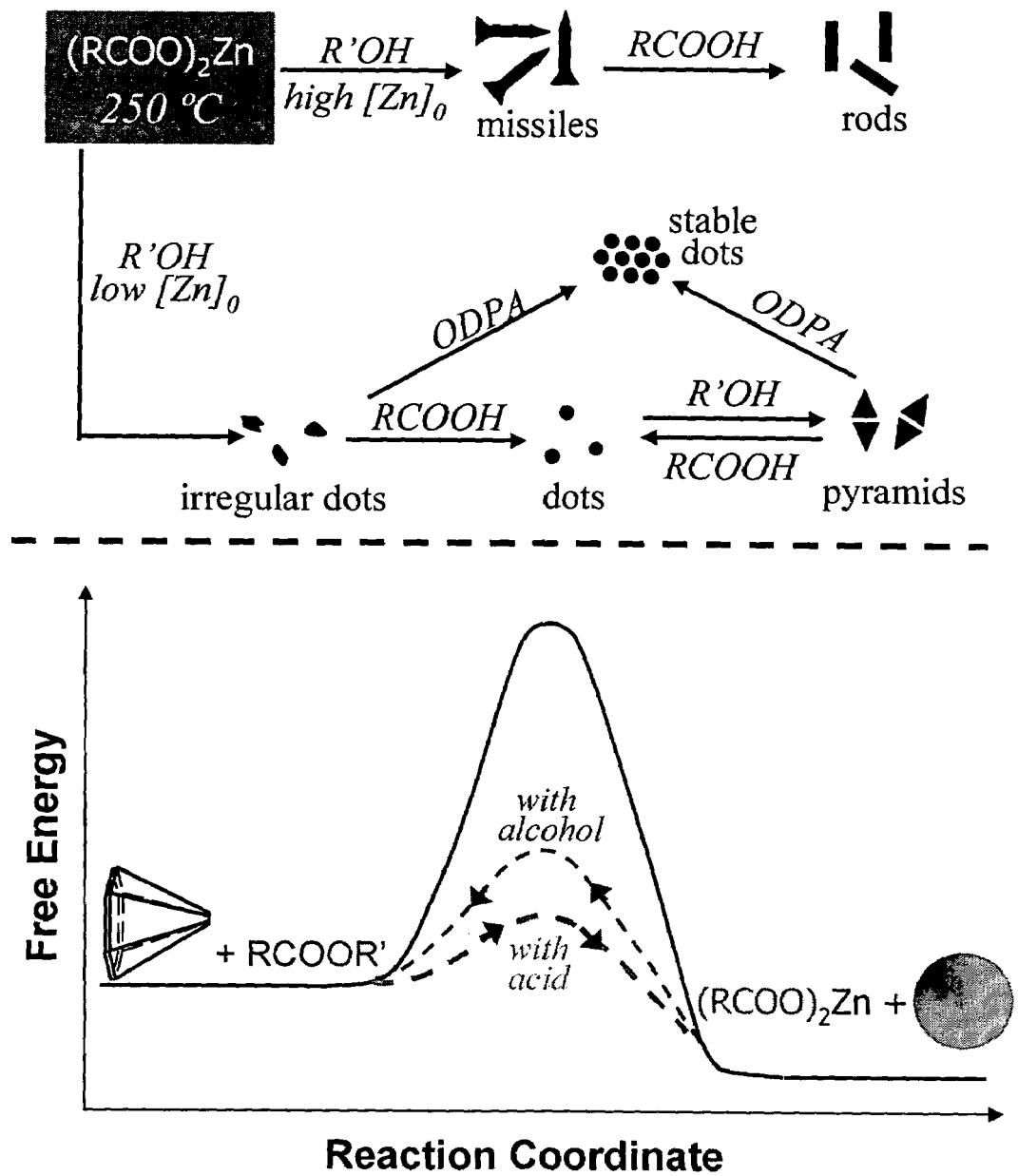
FIG. 8, top panel, summarizes shape evolution of ZnO nanocrystals. Bottom panel shows a schematic illustration of the free energy diagram expected for reversible shape transition without considering the free energy of organic species.

The shape evolution and shape-controlled growth of ZnO nanocrystals discussed above are summarized in FIG. 8, top panel. Although the thermodynamically stable shape for wurtzite crystals should be slightly elongated dot-shape, the above results demonstrate that many different shapes including the elongated ones were extremely stable if no acids were added into the system. This means that there is a kinetically prohibitive free energy barrier—a high activation energy—between two sets of size/shape distributions. This is consistent with the hypothesis that, after precursors are consumed, a nanocrystal dispersion with any size and shape in a high yield reaction shall remain as it is. For the shape transition between dots and pyramids, a simplified illustration of reaction free energy curve—without considering the free energy of the organic species—is proposed. From left to right, fatty acid is needed for the system to go through a low activation energy path, and reach spherical particles. Similarly, alcohol is needed to convert dot-shaped nanocrystals back to pyramids by going through the low activation path. If no activation reagent is used, the very high barrier (black solid line) will kinetically isolate one shape from another.

The formation of ester is a completely irreversible side reaction under the given conditions. This provides needed thermodynamic drive and warrants the unity yield for the decomposition of zinc stearate. However, the formation of zinc stearate by the addition of the fatty acid is irreversible only if no alcohol exists in the system. ODPA makes the reaction from left to right—dissolution of ZnO nanocrystals—to be irreversible under the reaction conditions even with alcohol, and thus the reaction is not really a high yield reaction, with some zinc trapped as phosphonic salts although the resulting nanocrystals are stable under reaction conditions.

Growth of non-equilibrium shapes under high monomer concentrations and focusing of size distribution observed for semiconductor systems seem both to be applicable for this high yield system. This is reasonable because it is believed that these two processes only require high monomer concentration under diffusion-controlled conditions. However, intra-particle ripening and Ostwald ripening (defocusing of size distribution) were not observed in the current system. This is not surprising since the last two phenomena need the growth reaction to be reversible with reasonably stable monomeric as the intermediates.

Wuff facets theory suggests that crystal growth should occur rapidly on high free energy facets. Experimental results in the nanometer regime further extended this thermodynamic argument to a kinetic version, that dominating growth would be possible on high free energy facets under highly kinetic controlled growth conditions. Assuming these theories to be applicable in the current system, the corners and the tip of pyramids should be high energy surfaces since the pyramids were reproducibly grown from more or less spherical nanocrystals. Interestingly, when acids are added in, these corners and the tip are "smoothed", which converts pyramids back to dots. This implies that dissolution of crystals may also occur preferably at high energy facets. This hypothesis is actually consistent with photoluminescence (PL) data. By PL, the trap emission states that caused the low energy tail are largely removed by the acid etching and further reduced by the following growth process. The broad emission band seen in the spectrum for the as-formed ZnO nanocrystals has been reported as the result of singly ionized oxygen traps. These and other trap states of ZnO have been frequently observed for nanocrystals and nanostructures formed under various conditions, which needed harsh treatment to remove. ZnO nanocrystals with nearly pure bandgap emission should be of importance as UV emitters and host for doped nanocrystals. The results shown here further imply that photoluminescence properties of ZnO nanocrystals and other types of nanocrystals can be controlled by optimizing growth conditions.

General Reaction Conditions:

The precursors used are metal fatty acid salts, although metal oxides also work in certain cases. Typically, reactions using metal fatty acid salts are reproducible, significantly better than the ones using metal oxide powder—dissolved by fatty acids directly in the reaction flask—as the starting material. To tune the activity of the metal fatty acid salts, a certain amount of the corresponding free fatty acids is employed as the ligands for both monomers and nanocrystals. The non-coordinating solvents are octadecene (ODE), n-eicosane, tetracosane, or mixture of ODE and tetracosane. Fatty acids with 10 to 18 carbon atoms per molecule are studied. Activation reagents, either primary amines or alcohols, are used in cases for accelerating the reaction rate and lowering the reaction temperature. No size sorting is applied for the samples used for the characterizations shown in this report.

Except where stated differently, the initial concentration of the precursor—metal fatty acid salts—is fixed at 0.2 mol/kg and a certain concentration of the corresponding free acids (ranging from 0 to 2 mol/kg) is added into a chosen non-coordinating solvent (5 grams). Air flow is in place because the reaction temperatures may be above the flammable point of the organic compounds. The mixture turns to a clear solution at around 100-200° C. The growth temperature for the oxide nanocrystals is tested between 300° C. and 380° C.

Typical Reaction for Growth of Oxide Nanocrystals without Activation Reagent:

Preparation of Fe(II)/Fe(III) Fatty Acid Salt:

Iron (II) stearate is commercially available and was used directly in the synthesis. Other iron fatty acid salts were prepared as summarized for iron oleate: 5.4 g $FeCl_3 \cdot 6H_2O$ or 4g $FeCl_2 \cdot 4H_2O$ was dissolved in 100 mL methanol, and then oleic acid was added in three equivalents (17 mL) for ferric salt and two equivalents (11 mL) for ferrous salt. Into one of these two solutions, a NaOH solution with 2.4 g (for ferric) or 1.6 g (for ferrous) of NaOH in 200 mL of methanol was dropped under magnetically stirring condition. The observed brown precipitate was washed with methanol for 4-5 times and dried under vacuum overnight to remove all solvents.

The salts made by the above procedure (approximately one mmol dissolved in 10 mL $CHCl_3$) were added dropwise into a stirred concentrate hydrochloric acid aqueous solution for digestion. The brown colored complex was converted into faint yellow colored iron chloride complex—which was in aqueous phase. The colorless chloroform extract, containing carboxylic acid was collected, dried and weighed. Based on the results the complex composition was determined as $Fe^{III}$(oleate)$_3$ or $Fe^{II}$(oleate)$_2$. The brown colored solid was dissolved in 20 mL of 1-octadecene (technical grade, 90%) at 60-70° C. and preserved as a stable stock solution at room temperature for the next step.

Synthesis of $Fe_3O_4$ Nanocrystals:

The $Fe_3O_4$ nanocrystals were prepared by the decomposition of iron-oleate complexes at 300° C. using octadecene as the solvent. The particle sizes can be controlled between 8-50 nm without using any activation reagent, by varying the amount of excess oleic acid, or by changing the concentration of the precursor salt during the reaction. Other non-spherical shapes such as cubes or spheroids can also be obtained by freezing the reaction at early stages.

In a typical synthesis, 1 mL of the stock solution made in the first step was mixed with 4 mL of octadecene and an appropriate amount of oleic acid (from 0.1 equivalent to 10 equivalent) and the mixture was heated to 300° C. under argon atmosphere. The reaction progress could be monitored by taking aliquots at different reaction time and observing the nanocrystals in the aliquots under TEM (JEOL 100 CX, 100 KV, copper-grids coated with Formvar film). XRD was recorded using standard methods FTIR was used to verify that the nanocrystals were coated with the corresponding fatty acid in its ionized form ($R-COO^-$).

Nanocrystals can be precipitated from the reaction mixture using a minimum amount of methanol/acetone and the precipitate was collected after centrifugation. This precipitate was re-dispersible in typical non-polar solvents such as chloroform and toluene. The precipitation/dispersion scheme was repeated for 2-3 times to purify the nanocrystals. No size sorting was applied for any samples used for the measurements discussed below.

Preferred conditions for formation of nanocrystals with several given sizes are:

8 nm size: Start with ferric oleate, use 0.1 equivalent excesses oleic acid, and heat the reaction mixture for 15-30 min.

30 nm size: Start with ferric oleate, use 3 equivalent excesses oleic acid, and heat the reaction for 30 min.

30 nm size cube particles: Start with ferrous oleate, use 2 equivalent excesses oleic acid, and heat the reaction for one hour.

Typical Reaction for Growth of Oxide Nanocrystals with Activation Reagents:

Using Fe(II)-stearate as the precursor, the iron oxide nanocrystals of about 3 nm in size can be prepared by using alkyl amine as activation reagent. In a typical synthesis, 0.622 g iron stearate and 0.269 g octadecylamine was mixed with 5 mL of octadecene and heated to 300° C. under argon atmosphere. The reaction was matured after 15 minutes heating. Following the same procedure described above, the nanocrystals were purified and characterized.

General Preparation Procedure of Metal Ion-carboxylic Acid Precursor:

One mmol of a metallic salt ($FeCl_3.6H_2O$, $FeCl_2.4H_2O$, $NiCl_2.6H_2O$, $CrCl_3.6H_2O$, $MnCl_2$) is dissolved in 10-20 mL methanol and then an appropriate amount (three equivalents for III and two equivalents for II oxidation state) of carboxylic acid, dissolved in 10-20 mL methanol, is mixed. No precipitation is observed at this stage. Next, equivalent amounts (with respect to carboxylic acid) of tetramethyl-ammonium hydroxide.$5H_2O$, dissolved in 10-20 mL of methanol, is added drop-wise under magnetic stirring. The observed colored precipitate (brown for iron, gray for nickel and manganese and green for chromium) is washed with methanol 4-5 times and dried under vacuum for overnight to remove all solvents. The carboxylic acids used are decanoic acid to stearic acid with carbon chain varying as 10, 12, 14, 16 and 18. Similarly, large amounts of precursor stocks are prepared. In that case, 10 mmol metal salt is used and other reagent amounts are increased accordingly. The colored solid mass is dissolved in appropriate amounts of 1-octadecene (technical grade, 90%) at 60-70° C. and preserved (without precipitate) in room temperature for stock solution. Other solvents such as chloroform, toluene can also be used to make precursor solution.

Preparation of Metal Oxide Nanoparticle:

Metal oxide nanoparticles are prepared by the decomposition of metal-carboxylate complexes at 300-340° C. using octadecene(ODE)/n-eicosane/n-tetracosane as the solvent. The decomposition temperature varies depending on metal complex. In particular, 300° C. can be used for iron and manganese complex, 340° C. for nickel and chromium complex. For chromium complex, the carboxylic acid complex is too stable and does not decompose even at 380° C., therefore, amine initiator is preferably used and the final reaction temperature is chosen as 340° C. in the presence of amine.

In a typical synthesis, one mmol precursor solid mass is mixed with 5 grams of solvent and appropriate amount of carboxylic acid (from 0 to 10 mmol) and the mixture is heated to 60-100° C. under argon atmosphere, to make a clear solution (for chromium precursor, 1 mM octadecylamine is added instead of carboxylic acid and the dissolution temperature is higher~250° C). At this stage, no particle formation is observed according to the TEM study or no color change of the reaction flask. In the next stage, the reaction temperature is increased to 300° C. (for iron and manganese system) or 340° C. (for nickel and chromium system). The reaction progress is monitored by freezing a small portion of the sample in toluene in room temperature at different time interval and investigated under TEM. The particle composition is determined by selected area electron diffraction of the samples and XRD. The crystal d-spacing is measured and compared with standard values. They correspond to $Fe_3O_4$, MnO, $Cr_2O_3$ and NiO.

The particle sizes can be controlled between 8-40 nm, by varying the amount of excess carboxylic acid, carboxylic acid chain length and reaction time. However, the most convenient way is to vary the excess carboxylic acid concentration. The non-spherical shapes such as cubes or spheroids of $Fe_3O_4$ or MnO can be obtained by freezing the reaction at early stages. For $Cr_2O_3$ and NiO the final products are triangular in shape and with time they tend to convert into spherical products. The final size and size distribution strongly depends on the starting reaction condition as well as the freezing time of the reaction. In particular, the size distribution is broad if no excess carboxylic acid is used for iron or manganese systems. Also long time heating, after the reaction is complete, always makes a poor size distribution.

The amine initiator induced reaction was also studied for the iron system, and in this case 1 mM Fe(II)-stearate is mixed with 0.1-10 mM octadecylamine and 5 g of octadecene and heated to 300° C. The final products are 3-4 nm in size and do not change with amine concentration.

Preparation of 40 nm Triangular $Co_3O_4$ 1 mmol Co-stearate, 0.5 mmol stearic acid, 2.5 gram tetracosane, and 2.5 gram ODE were loaded in a 50 ml three neck flask. The mixture is heated at 150° C. under magnetic stirring until forming homogeneous solution. The temperature is then raised to 340° C. The solution is heated at this temperature for 2 hours. The color of the solution changed from deep blue to deep green.

Preparation of 15 nm Triangular Zinc Oxide 0.2 mmol zinc stearate and 4 g ODE are loaded in a 25 mL three neck flask. The mixture is heated to 280° C. with magnetic stirring under argon flow. Then the mixture of 1 mmol octadecanol and 1 g ODE is heated to 200° C. and injected into the flask. The temperature is set at 250° C. for the growth of zinc oxide nanocrystals. After 10 minutes of growth, 0.15 mmol stearic acid in 0.5 g ODE at 120° C. is injected into the flask and reacted for 80 minutes. Then the second and third aliquot of acid is injected at the same condition and reacted for 80 minutes respectively. The resulting nanocrystals are spherical shortly after the injection of the fatty acids. The final product after long time reaction is triangular zinc oxide of 15 nm in size.

Conclusion

In summary, a relatively simple, reproducible, and general strategy for the growth of magnetic oxide nanocrystals based on pyrolysis of metal fatty acid salts in non-coordinating solvents is introduced. Preliminary results also reveal that the surface ligands of these magnetic oxide nanocrystals can be readily replaced by dendron ligands, resulting in soluble and extremely stable dendron-nanocrystals in a variety of solvents.

Provided that metal fatty acid salts are the most common, inexpensive, relatively safe, and room-temperature stable metal compounds soluble in non-aqueous solutions, this strategy may be extended to other metal oxide nanocrystals. An important concept introduced during the development of synthetic chemistry of semiconductor nanocrystals, balancing nucleation and growth by tuning the reactivity of the monomers, is verified to be valid for the formation of oxide nanocrystals as well. The similarity and difference in the growth of different types of oxide nanocrystals may permit a general understanding of formation of shape-controlled monodisperse inorganic nanocrystals. This new strategy is possible to be extended to a large scale, given that the process and the composition of the room-temperature stable starting materials are both simple.

Nearly monodisperse and shape-controlled ZnO nanocrystals with nearly pure bandgap photoluminescence can be synthesized through high yield reactions using generic chemicals. The irreversible side reaction, formation of ester, provides the thermodynamic driving force for the growth of the nanocrystals with a high yield when fatty acids are used as the ligands for the nanocrystals and the monomers. The reversible dissolution and irreversible growth make it possible for the nanocrystals to be reversibly converted from one shape to another and back to the original shape and size.

The invention is now described with reference to specific examples for purposes of illustration and explanation, but not by way of limitation.

EXAMPLES

Chemicals:

Iron (III) chloride hexahydrate (97%), iron (II) chloride tetrahydrate (99%), nickel chloride hexahydrate, chromium (III) chloride (98%), decanoic acid (99%), lauric acid (99.5%), myristic acid, palmitic acid (99%), oleic acid (tech. 90%), stearic acid (95%), tetramethylammonium hydroxide pentahydrate (97%), octadecylamine (97%), manganese (II) chloride (98%), 1-octadecene (tech. 90%), 1-octadecanol (99%) were purchased from Aldrich. Iron(II) stearate (Fe 9%), cobalt stearate, nickel stearate, zinc stearate (ZnO 12.5-14%), 1-octadecanol (97%), n-eicosane, n-tetracosane were purchased from Alfa Aesar. Octadecyl phosphoric acid (ODPA) was from Polycarbon Industries Inc. All chemicals were used directly without any further purification.

Example 1

Preparation of Fe(II)/Fe(III) Oleate 5.4 g of $FeCl_3.6H_2O$ or 4 g $FeCl_2.4H_2O$ was dissolved in 100 mL of methanol and then oleic acid was added in three equivalents (17 mL, technical grade, 90%) for ferric salt and two equivalents (11 mL, technical grade, 90%) for ferrous salt. Next, 2.4 g (for ferric) or 1.6 g (for ferrous) of NaOH was dissolved in 200 mL of methanol and mixed drop-wise under the magnetically stirring condition. The observed brown precipitate was washed with methanol by 4-5 times and dried under vacuum for overnight to remove all solvents. The brown colored solid mass was dissolved in 20 mL of 1-octadecene (technical grade, 90%) at 60-70° C. and preserved (without precipitate) in room temperature for stock solution.

Example 2

Preparation of Iron Oxide Nanocrystals

The iron oxide nanoparticles were prepared by the decomposition of iron-oleate complexes at 300° C. using octadecene as the solvent. The particle sizes can be controlled between about 8 and about 50 nm, by varying the amount of excess oleic acid, or by changing the concentration of precursor salt during the reaction. Other non-spherical shapes such as cubes or spheroids were also obtained by freezing the reaction at early stages. In a typical synthesis, 1 mL of stock solution is mixed with 4 mL of octadecene and appropriate amount of oleic acid (from 0.1 equivalent to 10 equivalent) and the mixture was heated to 300° C. under an argon atmosphere. The reaction progress is monitored, taking a small portion of the sample in toluene in room temperature (and thus freezing the reaction) in different time interval and investigated this sample under TEM.

The final size and size distribution strongly depended on the starting reaction conditions as well as the freezing time of the reaction. Typically, for high quality nanoparticles the following conditions were employed:

8 nm size: Start with ferric oleate, use 0.1 equivalent excesses oleic acid, that is, add 0.028 mL oleic acid (technical grade, 90%) and heat the reaction for 15-30 min.

12 nm size: Start with ferric oleate, use 1 equivalent excesses oleic acid, that is, add 0.28 mL oleic acid (technical grade, 90%) and heat the reaction for 15 min.

20 nm size: Start with ferric oleate, use 3 equivalent excesses oleic acid, that is, add 0.80 mL oleic acid (technical grade, 90%) and heat the reaction for 3 hs.

30 nm size: Start with ferric oleate, use 3 equivalent excesses oleic acid, that is, add 0.80 mL oleic acid (technical grade, 90%) and heat the reaction for 30 min. Alternatively, start with ferrous oleate, use 2 equivalent excesses oleic acid, that is, add 0.56 mL oleic acid (technical grade, 90%) and heat the reaction for 2 hs.

30 nm size cubic particles: Start with ferrous oleate, use 2 equivalent excesses oleic acid, that is, add 0.56 mL oleic acid (technical grade, 90%) and heat the reaction for one hour.

Alternatively, start with ferric oleate, use 5 equivalent excesses oleic acid, that is, add 1.4 mL oleic acid (technical grade, 90%) and heat the reaction for 3 hrs.

Example 3

Iron Oxide Nanoparticle Using Fe(II)-stearate as Precursor

Using Fe(II)-stearate as precursor, iron oxide nanoparticles of 3 nm can be prepared. In a typical synthesis, 0.622 g iron stearate and 0.269 g octadecylamine was mixed with 5 mL of octadecene and heated to 300° C. under argon atmosphere. The reaction was stopped after 15 minutes of heating.

Example 4

Purification of Nanoparticles

Particles were precipitated using minimum methanol/acetone and precipitate was collected after centrifugation. The nanoparticles were then redispersed in toluene. The precipitation/redispersion scheme was repeated for 2-3 times and finally dissolved in toluene and can be preserved for months.

Example 5

Synthesis of ZnO Nanopyramids and Shape Transition

Zinc stearate (0.2 mmol) and 4 g 1-octadecene (ODE) were loaded in a 25 ml three-necked flask. The mixture was heated to 280° C. under Ar atmosphere. 1-octadecanol (1 mmol) dissolved in 1 g ODE at 200° C. was quickly injected into zinc stearate solution, and the reaction temperature was then set at 250° C. throughout the entire synthesis. To synthesize ZnO nanopyramids, after the injection of 1-octadecanol for 8 minutes, stearic acid (0.2 mmol) dissolved in 0.5 g ODE at 120° C. was injected into ZnO nanocrystals solution and incubated for 2 hours. To convert the ZnO nanopyramids back to spherical particles, stearic acid (0.2 mmol) dissolved in 0.5 g ODE at 120° C. was injected into the ZnO nanopyramids solution, during the first few minutes after acid injection, the shape of ZnO nanocrystals were spherical. The ZnO spherical eventually came back to nanopyramids after prolonged heating. If 10 times more zinc stearate (2 mmol) was used, the reaction yielded nanotowers within a few minutes after the injection of 1-octadecanol. The tower-shaped nanocrystals were converted to nanorods by the addition of either stearic acids or ODPA following the same procedure described above.

Example 6

Synthesis of Stable Dot-shaped ZnO Nanocrystals

Stable dot-shaped ZnO nanocrystals were formed by the addition of 0.1 mmol 1-octadecanal phosphoric acid (ODPA) dissolved in 0.5 g ODE into the ZnO nanopyramids solution at 250° C. and incubated for a few minutes.

Example 7

Optical Measurements

Aliquots at different reaction stages were taken for TEM, UV and FTIR measurements. UV-vis spectra were taken on a HP 8453 UV-visible spectrophotometer; Photoluminescence spectra were recorded on a Fluorolog-3 spectrofluorometer. Infrared spectra were obtained on a Nicolet Impact 410 spectrophotometer and the specimen were prepared by dropping hexane solution of ZnO nanocrystals on a NaCl crystal and dried in air. For FTIR measurements, n-eicosane was used as the solvent, instead of ODE, because of its simple FTIR spectrum in the 1000-2000 $cm^{-1}$ window.

Example 8

Transmission Electron Microscopy (TEM)

TEM and high resolution TEM images were taken on a JEOL X-100 at 100 KV and a JEOL 2010 at 300 KV, respectively. Specimens for JOEL X-100 were prepared by dipping a Formvar-coated copper grid into a toluene solution of the nanocrystals, and the grid with the nanocrystals was dried in air. Selected area electron diffraction (SAED) pattern was taken with a camera length of 120 cm. Specimens for JOEL 2010 were prepared by dipping a carbon film coated copper grid into toluene solution of ZnO nanocrystals and dried in air.

Example 9

Synthesis of $In_2O_3$ Nanoparticles

The precursor used for the generation of $In_2O_3$ nanoparticles was indium stearate. Since indium stearate is not commercially available, the following procedure was used for its preparation. 0.01 mol of indium acetate was mixed with an excess of stearic acid (0.2 mol) and heated to 140° C. under a steady stream of argon. This reaction was allowed to run for a period of 5 hrs, after which was the product was isolated by dissolving it in toluene and then precipitating it by adding acetone. This dissolution/precipitation process was repeated 3-4 times to remove all the excess stearic acid used in the reaction. The precipitate was finally dried under vacuum overnight to remove all the solvents. The purity of the product was analyzed by NMR and IR spectroscopy. The white solid was dissolved in 10 g of octadecene (ODE) (technical grade, 90%) at 120° C. and preserved as a stable stock solution.

In a typical synthesis of $In_2O_3$ nanoparticles, 0.5 g of the stock solution made in the first step was injected to 4.5 g of ODE at 300° C. under an argon atmosphere. After 10 min of the reaction, 0.06 mmol of octadecyl alcohol in 0.25 g of ODE was injected to the reaction mixture to ensure proper decomposition. The reaction was matured after 20 min of heating, yielding 8 nm particles. Aliquots were taken periodically during the reaction to monitor the growth of nanocrystals by transmission electron microscopy (TEM). FTIR was used to study the ligands on the surface of nanocrystals.

Nanocrystals can be precipitated from the reaction mixture using a minimum amount of ethyl acetate and the precipitate was collected after centrifugation. The precipitate was redispersible in non-polar solvents like chloroform and toluene. Purification was done by precipitation/dispersion in acetone/toluene repeatedly. Size sorting was not applied.

The conditions for the formation of nanocrystals with given sizes are as follows:

4 nm size: Heat the reaction mixture for 30-45 sec 6 nm size: Heat the mixture for 5 min.

8nm size: Heat for 20 min.

Figure 9:
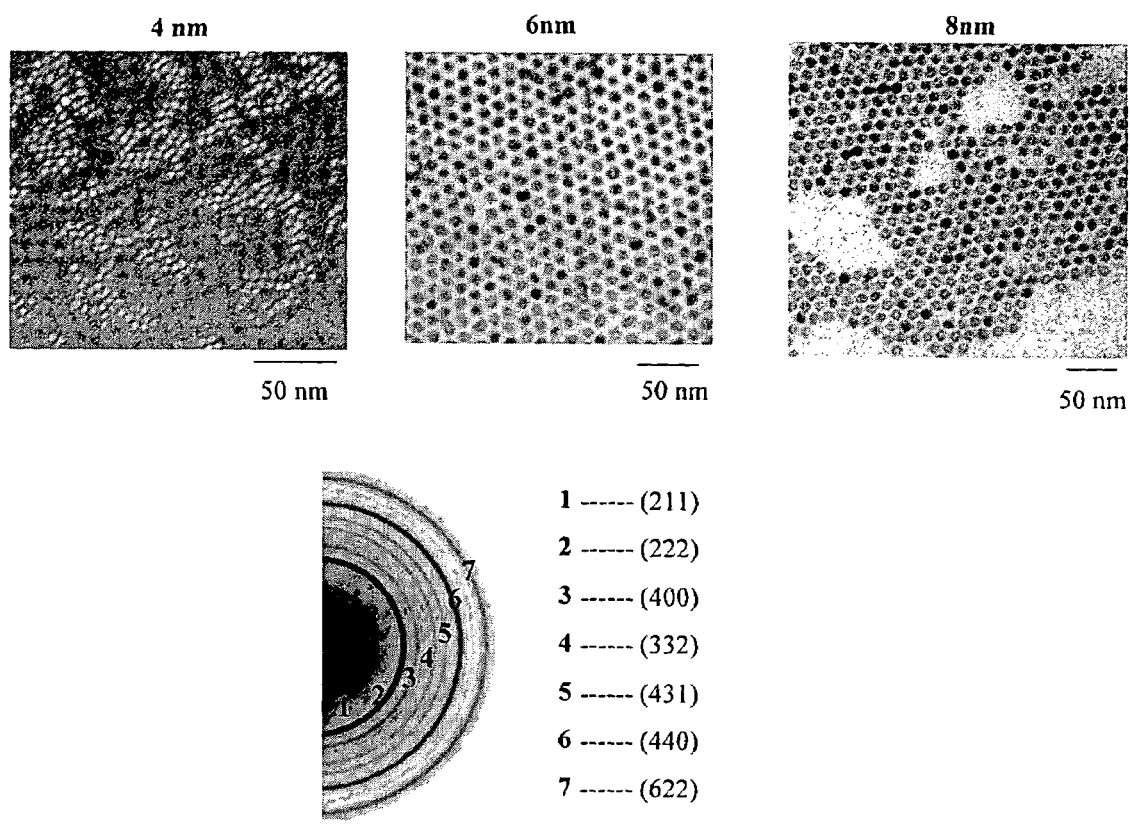
FIG. 9 shows TEM images of $In_2O_3$ nanocrystals of different sizes prepared according to the principles of the present invention.

TEM pictures of $In_2O_3$ nanocrystals of different sizes are shown in FIG. 9.

Example 10

Synthesis of Tin(IV) Oxide

Tin(IV) acetate(0.1 mmol) was mixed with oleic acid(4 mmol) and 0.5 g of ODE and heated to 80° C. to form a clear solution. This solution was used as a precursor for the synthesis of tin(IV) oxide nanoparticles. In a typical reaction, the above solution was injected into a reaction flask containing 4.5 g ODE at 250° C. under an argon atmosphere. The reaction was matured after 10 min of heating.

Nanocrystals can be precipitated using a minimum amount of acetone and the precipitate was collected after centrifugation. This precipitate was readily soluble in toluene. The precipitation/dispersion scheme was repeated 2-3 times to purify the nanocrystals. TEM images revealed 4 nm sized $SnO_2$ nanoparticles.

Example 11

Figure 10:
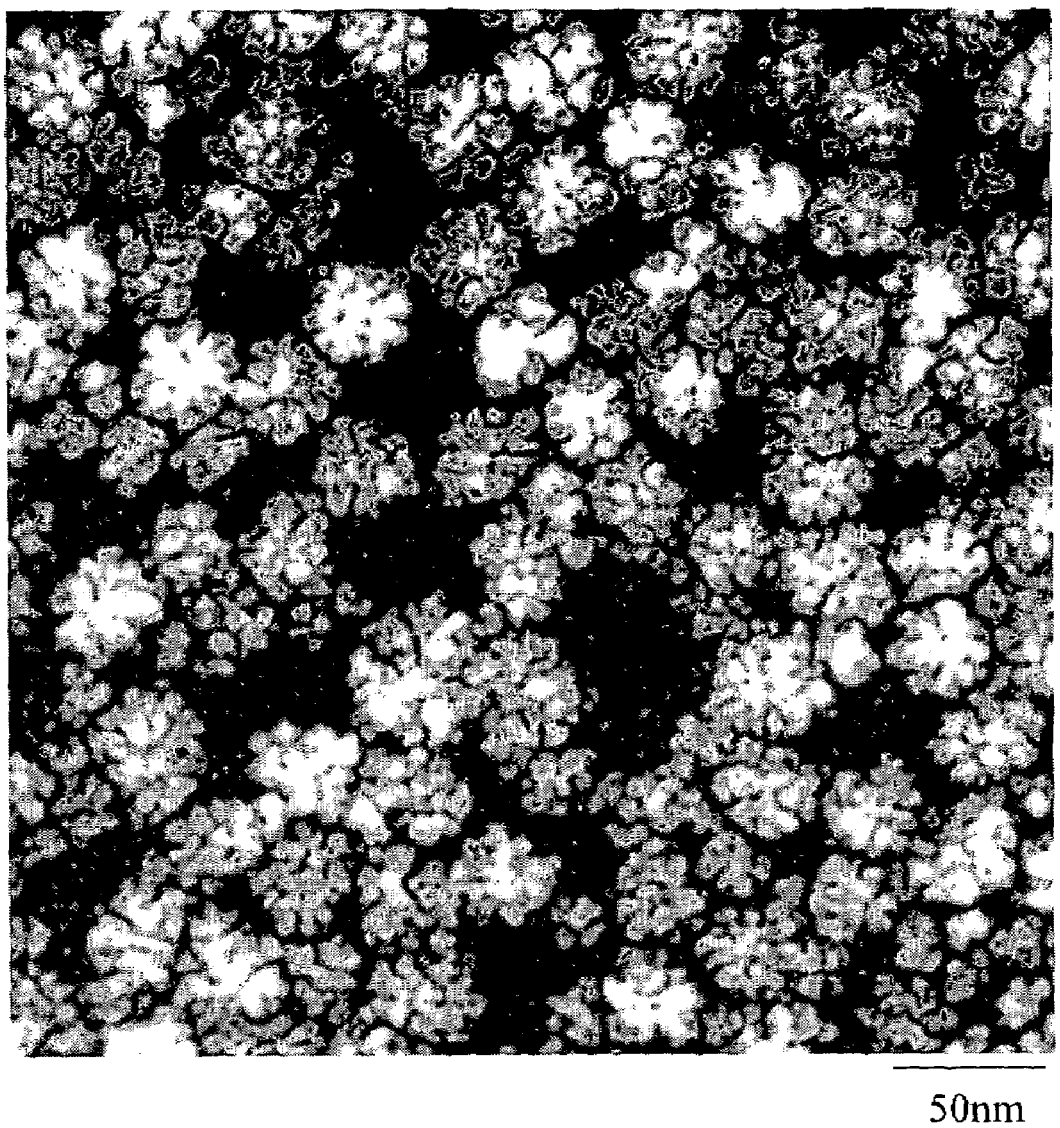
FIG. 10 shows typical TEM images of ITO nanoparticles synthesized according to the principles of the present invention.

Synthesis of ITO Nanoparticles 0.096 g of indium stearate was dissolved in 1.5 g of octadecene at 120° C. In another vial 0.035 g of tin(IV) acetate was mixed with 0.113 g of oleic acid and 1.5 g of ODE and heated to 90° C. to give a clear solution. Both the solutions containing indium and tin were then mixed. 0.4 ml of this stock solution was injected to 4.5 g of ODE at 290° C. Initially the color of the mixture turned yellow. After 5 min into the reaction 0.135 g of octadecanol mixed with 0.5 g of ODE was injected into the reaction mixture. Within minutes the color of the reaction mixture became greenish-yellow. Aliquots were taken at regular intervals to monitor the nanocrystals by TEM. The In:Sn ratio was calculated using atomic absorption spectroscopy (AAS). FIG. 10 shows a typical TEM image of ITO nanoparticles.

The present invention has been described hereinabove with reference to certain examples for purposes of clarity and understanding. It should be apparent to the skilled observer that obvious improvements and modifications of the invention can be practiced within the scope of the appended claims.

What is claimed is:

1. A method of making nanometer-scale metal oxide particles, comprising:
   a. combining a metal fatty acid salt, a fatty acid, and a hydrocarbon solvent to form an admixture thereof; and
   b. heating the admixture to a temperature of at least 300° C. until the metal oxide particles are formed.

2. The method of claim 1, wherein the metal oxide is an oxide of Fe, Mn, Cr, Ni, Co, Zn, In or Sn, or combination thereof.

3. The method of claim 1, wherein the metal oxide particles are crystalline, semi-crystalline or polycrystalline.

4. The method of claim 1, wherein a monodisperse distribution of the metal oxide particles is formed.

5. The method of claim 1, wherein the metal oxide particles have a particle size in the range of about 5 nm to about 100 nm.

6. The method of claim 1, wherein the metal fatty acid salt comprises a metal selected from the group consisting of Fe, Mn, Cr, Ni, Co, Zn, In and Sn.

7. The method of claim 1, wherein the metal fatty acid salt is a stearate, oleate or myristate salt.

8. The method of claim 1, wherein the fatty acid is selected from stearic acid, oleic acid, and myristic acid.

9. The method of claim 1, wherein the hydrocarbon solvent comprises octadecene, n-eicosane, n-tetracosane, and combinations thereof.

10. The method of claim 1, wherein the molar ratio of fatty acid to metal fatty acid salt is in the range of 10 or lower.

11. The method of claim 1, further comprising combining an amine or alcohol activation reagent with the metal fatty acid salt.

12. The method of claim 1, further comprising annealing the metal oxide particles at elevated temperature.

\* \* \* \* \*